July 20, 1937.  E. F. ROSSMAN ET AL  2,087,451

SHOCK ABSORBER

Filed Dec. 13, 1935  2 Sheets-Sheet 1

INVENTORS
FREDERICK D. FUNSTON
EDWIN F. ROSSMAN
BY
*Spencer, Hardman and Fehr*
ATTORNEYS July 20, 1937.   E. F. ROSSMAN ET AL   2,087,451
SHOCK ABSORBER
Filed Dec. 13, 1935   2 Sheets-Sheet 2
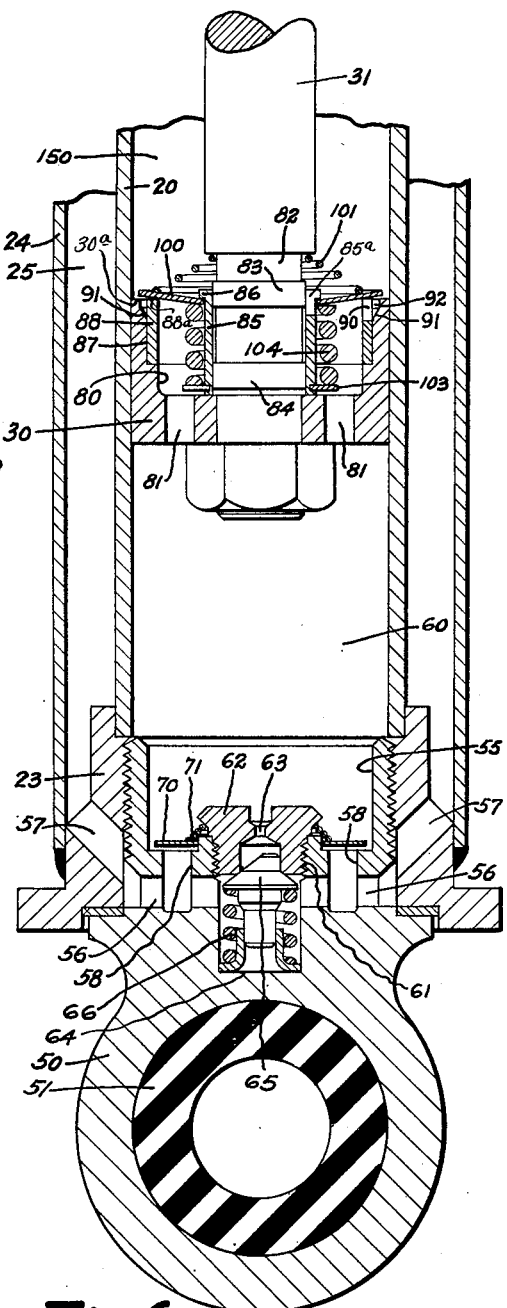
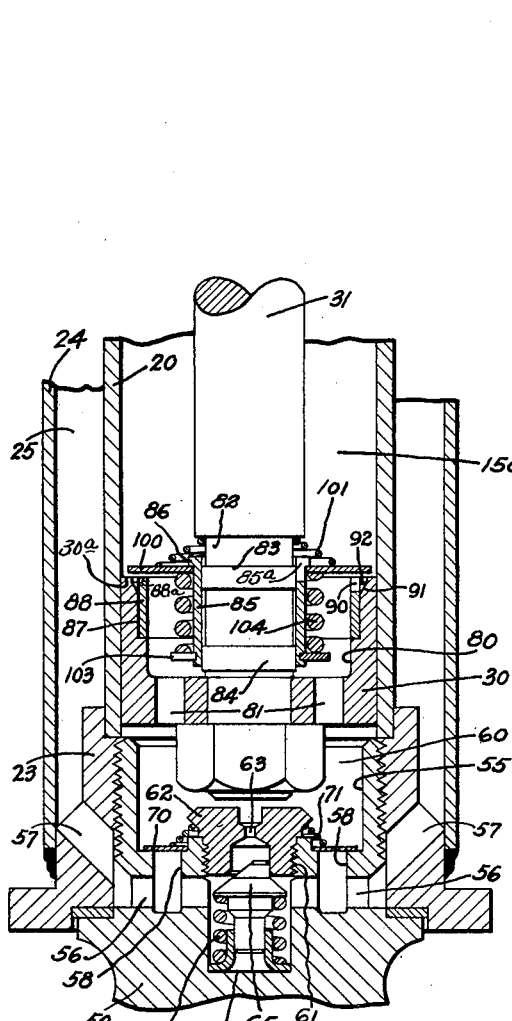
Fig. 5.
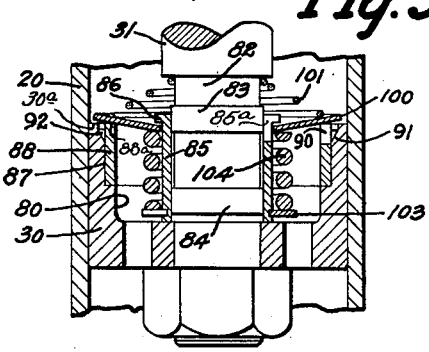
Fig. 7.
Fig. 6.
INVENTORS
FREDERICK D. FUNSTON
EDWIN F. ROSSMAN
BY
Spencer, Hardman and Fehr
ATTORNEYS Patented July 20, 1937

2,087,451

UNITED STATES PATENT OFFICE 2,087,451

SHOCK ABSORBER

Edwin F. Rossman and Frederick D. Funston, Dayton, Ohio, assignors to General Motors Corporation, Detroit, Mich., a corporation of Delaware Application December 13, 1935, Serial No. 54,158

15 Claims. (Cl. 188—88)

This invention relates to an improved form of direct-acting hydraulic shock absorbers.

It is among the objects of the present invention to provide a direct-acting hydraulic shock absorber with fluid flow control devices of simple construction, which are adapted to control the circulation of fluid within the shock absorber so that it will properly control both the approaching and separating movements of the axle and frame of the vehicle between which said shock absorber is directly mounted.

A further object of the present invention is to provide the shock absorber piston with a single valve member capable of two distinct actions. One valve action permits a substantially free flow of fluid through the piston as it moves in one direction, the other valve action permitting a restricted flow of fluid through the piston as it moves in the opposite direction.

Further objects and advantages will be apparent from the following description, reference being had to the accompanying drawings wherein a preferred embodiment of the present invention is clearly shown.

In the drawings:

Figure 5 is a view similar to Figure 3, and shows the fluid flow control devices in the positions assumed as the piston moves downwardly in the shock absorber;

Figure 6 is a view similar to Figures 3 and 5. Here the fluid flow control devices are shown in the positions assumed as the piston moves upwardly; and Figure 7 is a fragmentary sectional view showing the fluid flow control device of the piston in the position its assumes when excessively high fluid pressures are attained as the piston moves upwardly.

Figure 1:
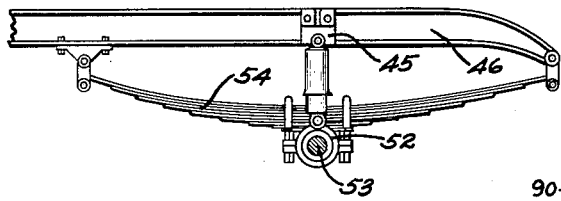
Figure 1 is a fragmentary side view of a vehicle chassis having a shock absorber equipped with the present invention attached thereto. The wheel of the vehicle has been omitted for the sake of clearness.
Figure 4:
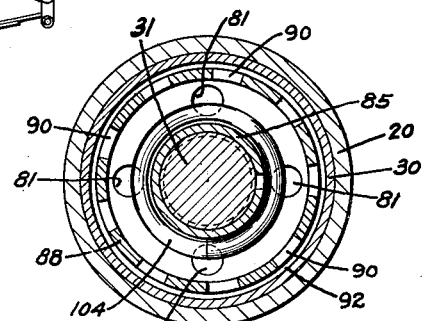
Figure 4 is a transverse sectional view taken along the line 4—4 of Figure 3.

The shock absorber comprises a tubular member 20 providing the working cylinder of the device. The upper end of this cylinder fits upon a flange 21, of the upper head member 22, the lower end of said cylinder fitting into a recess formed in the lower head member 23. Another tubular member 24 surrounds the working cylinder 20, the ends of this tubular member 24 fitting upon the heads 22 and 23 and being welded thereto so as to fixedly hold the two cylinders 20 and 24, and the heads 22 and 23 in assembled relation. This tubular member 24 provides the reservoir 25 which is the space surrounding the working cylinder 20.

Within the cylinder there is provided a piston 30 attached to one end of the piston rod 31 which is slidably supported in a bearing 32 carried in the cylinder head 22. The cylinder head 22 as shown in Figure 1 is recessed to receive a packing for preventing the escape of any fluid that might leak past the shaft bearing 32. Any suitable type of packing may be used about the shaft 31. In the present instance, however, there is shown a collar 33 fitted snugly within the recess 34 of the head 22. This collar has a packing element 35 carried within it, which frictionally engages the shaft 31. In order to maintain this frictional engagement of packing 35 with the shaft, there is provided a pressure plate 36 having an inwardly sloping surface engaging the end of the packing 35. This pressure plate is maintained in constant engagement with the packing 35 by a spring 37, interposed between the lower surface of the recess 34 and the pressure plate 36. Openings 38 in the head provide communication between the recess 34 and the reservoir 25 so that in case liquid escapes through the shaft bearing 32, it is wiped from the shaft by the packing member 35, urged against said shaft by the plate 36 and its spring 37, this liquid then dropping into the bottom of the recess from where it may return to the reservoir via the passage 38.

Figure 2:
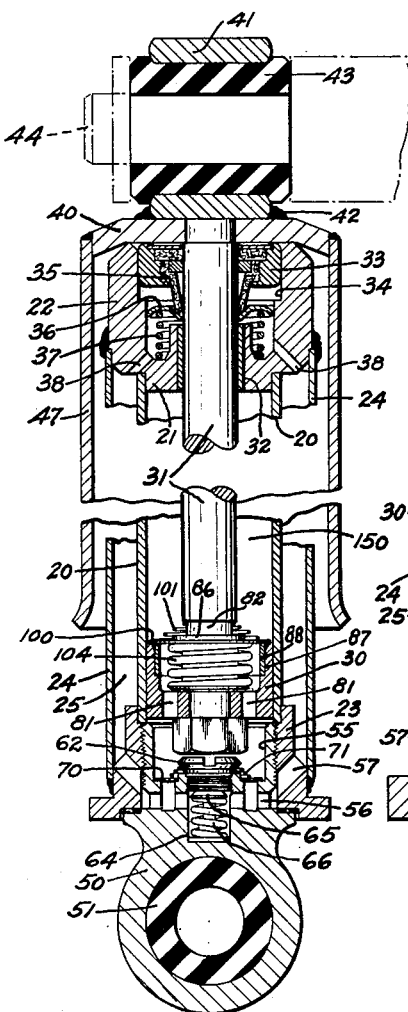
Figure 2 is a longitudinal sectional view of the shock absorber, certain parts being shown in elevation in order more clearly to illustrate them.

The outer end of the shaft 31 has a plate or disc 40 secured thereto, to which is secured a fixture 41 in any suitable manner. In the present instance this fixture is shown welded to the disc 40, as at 42. The fixture, as shown in Figure 2, receives a rubber grommet 43 through which extends the bolt 44, shown in dotted lines, said bolt being a part of bracket 45 attached to the frame 46 of the vehicle. This presents a yieldably, hinged connection between the piston rod 31 of the shock absorber and the frame 45 of the vehicle. One end of a tubular member 47 is secured to the disc 40 in a manner so that said tubular member 47 is substantially coaxial of the tubular members 20 and 24. The tubular member 47 is of such length that when the shock absorber is entirely collapsed, as shown in Figure 2, that is, where the piston is positioned at the extreme lower end of the cylinder, the bottom end of said tubular member 47 is located within a short distance of the bottom end of the tubular member 24. This member 47 forms a dust cover for the shock absorber substantially preventing dust or grit from accumulating at the exposed part of the piston shaft at the upper end of the shock absorber.

As shown in the various figures, the lower cylinder head, or end member 23, is interiorly threaded so as to receive the threaded end of the lower mounting fixture 50, which, as shown in Figure 2, receives a rubber grommet 51 adapted to fit over a stud provided on the lower mounted bracket 52. As shown in Figure 1, this lower mounted bracket is attached to the axle 53 of the vehicle which axle supports the vehicle spring 54 hinged at its respective ends to the vehicle frame 45. Thus it may be seen that the housing or cylinder portion of the shock absorber is secured to the axle while the piston and its shaft is secured to the frame of the vehicle and consequently any relative movements between the frame and axle of the vehicle will result in relative movement between the piston and cylinder of the shock absorber.

Figure 3:
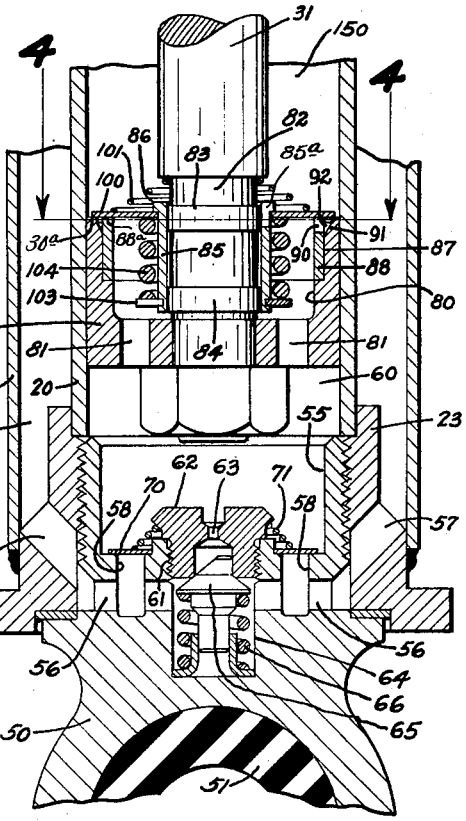
Figure 3 is an enlarged fragmentary sectional view showing the construction of the fluid flow control devices of the shock absorber in their normal position.

Referring particularly to Figure 3, it may be seen that the end of the lower mounting fixture 50 threadedly received by the lower cylinder head 23 is recessed, as at 55. A cross passage 56 is also provided in this fixture, said cross passage communicating with passages 57 in the lower cylinder head 23. Passages 58 in the fixture connect the recessed portion 55 with the transverse or cross passage 56 so that by means of these various passages 57, 56 and 58 communication between the reservoir 25 and the lower fluid displacement chamber 60 of the shock absorber is provided. Another communication between the recess 55 and the transverse passage 56 is provided by the interiorly threaded central opening 61 in the fixture 50 which receives the screw plug 62 having a through passage provided with a restricted throat portion 63. This opening 61 extends into the main body portion of the fixture 50 to provide a recess 64 which forms a housing for the pressure relief valve 65 urged by spring 66 against the plug 62 normally to close its central passage. This valve 65 is adapted to be moved from engagement with the plug 62 to permit a fluid flow through its restricted throat portion when a predetermined fluid pressure is established within the fluid displacement chamber 60 in response to downward movement of the piston 30.

The openings 58 are normally closed by a disc valve 70 yieldably urged into a closed position by a spring 71 interposed between the disc valve and the head of the screw plug 62. This valve 70 may be termed the intake valve for it is adapted to be lifted to open passages 58 and thus permit a substantially unrestricted flow of fluid to enter the chamber 60 from the reservoir 25 in response to upward movements of the piston 30.

As shown in Figures 3, 5, 6 and 7, the piston 30 is recessed as at 80. The bottom wall of this recess in the piston has openings 81 providing for the transfer of fluid from one side of the piston to the other in response to its reciprocation. The piston-rod 31 has a reduced diameter portion 82 adjacent the end secured to the piston, two spaced flanges 83 and 84 being provided on this reduced portion 82. These spaced annular flanges 83 and 84 provide bearings upon which a collar 85 is slidably supported, the end of this collar more remote from the inner end of the piston having an annular flange 86. The outer end of the recess 80 of the piston is counterbored as at 87 to receive a ring 88 which fits snugly into this counterbored portion 87. Ring 88 is of such a width that when fitted into the counterbored portion 87 of the piston its outer edge 88a will be flush with the outer edge 30a of the piston. This is clearly shown in Figure 5. Spaced notches 90 are provided in this outer edge of the ring 88. The inner peripheral edge of the counterbore portion 87 on the piston is cut away to provide a sloping face 91. Thus, an annular groove 92 is formed between the outer edge of the piston 30 and the ring 88 fitting in its counterbored portion 87. The notches 90 communicate with this annular groove 92. In Figures 3, 5 and 6, it may be seen that this annular groove 92 is triangular in cross section.

A disc valve 100 is centrally apertured to fit about the collar or sleeve 85. This valve 100 is yieldably urged to engage the outer, concentric edges 30a and 88a of the piston 30 and the ring 88 respectively by the spring 101 interposed between said valve 100 and the shoulder formed on the rod 31 by the smaller diameter portion 82. The end of the sleeve or collar 85 adjacent the head of the piston 30 has an abutment collar 103 which is engaged by one end of the spring 104, the other end of said spring engaging the valve 100 and holding it against the inner edge of the flange 86 on sleeve or collar 85. This spring is so constructed that it does not urge the valve 100 against the flange 86 with any great pressure, the spring being so made that it merely holds said valve against said flange.

An opening or notch 85a is provided in the collar 85, forming an orifice through which an initial, restricted flow of fluid is permitted as the piston is reciprocated and before the valve 100 is moved by fluid pressure out of its normal position.

The afore-described shock absorber functions in the following manner: when the wheels of the vehicle strike an obstruction in the roadway the axle 53 is thrust upwardly toward the frame 45, causing a downward movement of the piston 30 relatively to the cylinder 20. As the piston moves downwardly in the cylinder 20 it exerts pressure upon the fluid within the lower displacement chamber 60, causing the valve 100 and its sleeve 85 to be moved upwardly so that the valve 100 is lifted from engagement with the outer edges of the piston 30 and its ring 88, as shown in Figure 5. This permits a substantially free flow of fluid from the lower displacement chamber 60 through the piston passages 81 and recess 80, past the valve 100 into the upper fluid displacement chamber 150 of the shock absorber. The entire fluid displacement from chamber 60 can not be received by the upper chamber 150 due to the presence of the piston rod 31 in said chamber 150. Consequently, this excess fluid, not adapted to be received by chamber 150 will be urged through the restricted throat portion 63 in the plug 62, exerting a pressure upon the valve 65 which causes it to be moved out of engagement with the plug and thus providing for a flow of fluid from the restricted throat portion 63, past valve 65 into the transverse passage 66, thence through the ducts or passages 57 in the cylinder head 23, into the reservoir 25. This restriction to the flow of fluid from the chamber 60 by the restricted throat portion 63 will cause the shock absorber to provide resistance to the approaching movement of the axle 53 toward the frame 45 in response to the striking of an obstruction or bump in the roadway.

The spring 54 of the vehicle will move the axle 53 away from the frame 45 with a rebounding movement, thus causing the piston 30 to move upwardly relatively to the cylinder 20 and consequently exerting pressure upon the fluid in the upper fluid displacement chamber 150. This fluid pressure exerted upon the valve 100 will urge it against the edge of the piston and its inner ring 88, said fluid pressure when attaining a predetermined value causing the disc valve 100 to flex, as shown in Figure 6. This initial flexure will not compress spring 104 to any appreciable degree due to the fact that sleeve 85 will slide downwardly on piston-rod 31 until it engages the piston head as shown in Figure 6. Referring to Figure 6, it will be seen that the flexing of valve 100 really moves the valve 100 about the inner peripheral edge of the ring 88 so that the outer peripheral edge of the valve 100 is lifted out of engagement with the edge of the piston 30, thereby uncovering the annular groove 92 and consequently permitting a restricted flow of fluid from chamber 150 past the edge of valve 100 into the annular groove 92 and thence through the spaced notches 90 in the ring 88, into the interior of piston from whence the fluid will flow through piston passage 81 into the lower displacement chamber 60. Under these circumstances the fluid displaced from chamber 150 through the groove 92 into the chamber 60 will not be sufficient to fill the chamber 60 as said piston moves upwardly and consequently valve 70 will be lifted into the position as shown in Figure 6, thereby permitting a substantially unrestricted flow of fluid from the reservoir 25 through passage 57, 56 and 58 into the lower displacement chamber 60 to compensate for this deficiency and assure a full lower chamber at the end of the upward stroke of the piston.

If for any reason the fluid pressure in the upper displacement chamber 150 becomes excessive, the disc valve 100 will be flexed to a greater degree than described above, this further flexing of the disc valve compressing spring 104. This is clearly illustrated in Figure 7 where it is shown that spring 104 in being compressed opposes the flexing of the disc valve 100 beyond a predetermined point, or more specifically beyond the point of flexure as shown in Figure 6. Naturally, the position of the disc valve 100, as shown in Figure 7, will cause the fluid flow through piston 23 to be less restricted and thereby more completely relieve the excessive pressure in the chamber 150.

While the form of embodiment of the present invention as herein disclosed constitutes a preferred form, it is to be understood that other forms might be adopted, all coming within the scope of the claims which follow.

What is claimed is as follows:

1. A hydraulic shock absorber comprising in combination, a cylinder; a piston forming two fluid displacement chambers within the cylinder, said piston having a passage providing for the transfer of fluid between said chambers; and a member, normally engaging said piston, but adapted to be moved bodily from engagement with the piston to permit a flow of fluid through said piston passage in one direction, and also adapted to be urged against the piston and be flexed to disengage a portion of said member from the piston for permitting a flow of fluid through the piston passage in the other direction.

2. A hydraulic shock absorber comprising in combination, a cylinder; a piston forming two fluid displacement chambers within the cylinder, said piston having a passage providing for the transfer of fluid between said chambers; and a member, normally engaging said piston, but adapted to be moved bodily from engagement with the piston to permit a substantially unrestricted flow of fluid through said piston passage in one direction, and also adapted to be urged against the piston and be flexed to lift the peripheral edge of said member from the piston for permitting a restricted flow of fluid through the piston passage in the other direction.

3. A hydraulic shock absorber comprising in combination, a cylinder; a piston forming two fluid displacement chambers within the cylinder, said piston having a passage providing for the transfer of fluid between said chambers; and a disc, yieldably urged normally to engage said piston, said disc being adapted to be lifted bodily from the piston to permit a flow of fluid through the piston passage in one direction and to be urged against the piston and be flexed to permit a flow of fluid through said piston passage in the other direction.

4. A hydraulic shock absorber comprising in combination, a cylinder; a piston forming two fluid displacement chambers within the cylinder, said piston having a passage providing for the transfer of fluid between said chambers; and a disc, yieldably urged normally to engage said piston, said disc being adapted to be lifted bodily from the piston to permit a substantially unrestricted flow of fluid through the piston passage in one direction and to be urged against the piston and be flexed to permit a restricted flow of fluid through said piston passage in the other direction.

5. A hydraulic shock absorber comprising in combination, a cylinder; a piston in said cylinder, said piston having a passage providing for the transfer of fluid from one side of the piston to the other, the piston having also two concentrically arranged valve-seat portions spaced to provide an annular chamber therebetween, the inner valve-seat having spaced notches; and a member yieldably urged to seat upon both valve-seat portions, normally substantially to close the piston passage, said member being movable bodily from both seat portions of the piston, to permit a substantially free flow of fluid through the piston passage in one direction, and being adapted to be urged against the piston and be flexed, whereby said member, pivoting on one seat portion, will lift from the other seat portion to permit a restricted flow of fluid through the notches in the one seat portion and through the piston in the opposite direction.

6. A hydraulic shock absorber comprising in combination, a cylinder; a piston in said cylinder forming two fluid displacement chambers therein, said piston having a fluid passage; and a single element normally substantially closing said passage and adapted to be moved bodily to permit a substantially unrestricted flow of fluid through the piston as it moves in one direction and to be distorted from its normal shape to provide for a restricted flow through the piston as it moves in the opposite direction.

7. A hydraulic shock absorber comprising in combination, a cylinder; a piston in said cylinder, forming two fluid displacement chambers therein, said piston having a fluid passage; and a disc, normally engaging the piston and bodily movable off the piston to establish a substantially free flow and adapted to be distorted to establish a restricted flow of fluid through the piston.

8. A hydraulic shock absorber comprising, in combination, a cylinder; a piston in said cylinder forming two fluid displacement chambers therein, said piston having a fluid passage; a fluid reservoir; oppositely acting fluid flow control means adapted to regulate the transfer of fluid between the reservoir and one of the displacement chambers; and a single member, normally substantially closing the piston passage, but adapted to provide for a fluid flow through said piston substantially concurrently with the opening of either of the fluid flow control means.

9. A hydraulic shock absorber comprising in combination, a cylinder; a piston in said cylinder forming two fluid displacement chambers therein, said piston having a fluid passage; a fluid reservoir communicating with one of said displacement chambers through two passages; valves normally closing said passages, one valve adapted to permit fluid to flow from the reservoir into said chamber the other from the chamber into the reservoir; and a single valve normally substantially closing the piston passage, but adapted to permit a fluid flow through the piston concurrently with the opening of either of the first-mentioned valves.

10. A hydraulic shock absorber comprising, in combination, a cylinder; a piston in said cylinder forming two fluid displacement chambers therein, said piston having a fluid passage; a fluid reservoir communicating with one of said displacement chambers through two passages; valves normally closing said passages, one valve adapted to permit a substantially unrestricted flow of fluid from the reservoir into the one chamber, the other valve being adapted to permit a restricted flow of fluid from said chamber into the reservoir; and a disc valve normally engaging the piston, adapted to be actuated to provide a fluid flow restricting orifice in the piston concurrently with the unrestricted flow of fluid from the reservoir into said chamber and adapted to permit a substantially unrestricted flow of fluid through the piston concurrently with the restricted flow of fluid from said chamber into the reservoir.

11. A hydraulic shock absorber comprising, in combination, a cylinder; a piston in said cylinder forming two fluid displacement chambers therein, said piston having a fluid passage; a fluid reservoir communicating with one of said displacement chambers through two passages; an intake valve normally closing one of said passages and adapted to provide for a substantially free flow of fluid from the reservoir into the chamber as the piston moves in one direction; a pressure release valve normally closing the other of said passages and adapted to provide for a restricted flow of fluid from the one chamber into the reservoir as the piston moves in the opposite direction; and a disc valve yieldably urged against the piston, said disc valve being adapted to be lifted from the piston to permit a substantially free flow of fluid through the piston passage concurrently with the opening of the pressure release valve and being adapted to be urged against the piston and be flexed to provide for a restricted flow of fluid through the piston passage concurrently with the opening of the intake valve.

12. A hydraulic shock absorber comprising, in combination, a cylinder; a piston in said cylinder, having a passage providing for the transfer of fluid from one side of the piston to the other; a disc valve normally engaging said piston, said disc valve being adapted to be lifted from the piston to provide for a substantially free flow of fluid through the piston passage and adapted to be flexed to provide for a restricted flow of fluid through said passage; and means adapted to be engaged by the disc-valve when flexed to a predetermined position, said means resisting further flexing of said disc-valve.

13. A hydraulic shock absorber comprising, in combination, a cylinder; a piston in said cylinder, having a passage providing for the transfer of fluid from one side of the piston to the other; a disc-valve normally engaging said piston, said disc-valve being adapted to be lifted bodily from the piston to provide for a substantially free flow of fluid through the piston passage and adapted to be flexed to provide for a restricted flow of fluid through said passage; and a spring adapted to be engaged by the flexing disc-valve to resist its flexing beyond a predetermined point.

14. A hydraulic shock absorber comprising, in combination, a cylinder; a piston in said cylinder, having a passage providing for the transfer of fluid from one side of the piston to the other; a disc-valve normally engaging said piston, said disc-valve being adapted to be lifted bodily from the piston to provide for a substantially free flow of fluid through the piston passage and adapted to be flexed to provide for a restricted flow of fluid through said passage; and a spring engaging each side of said disc-valve, the lighter spring urging said disc-valve upon the piston, the heavier spring being adapted to oppose the flexing of said disc-valve beyond a predetermined point.

15. A hydraulic shock absorber comprising, in combination, a cylinder; a piston in said cylinder, having a passage providing for the transfer of fluid from one side of the piston to the other; a piston rod; a flanged collar slidable on said rod; a disc-valve fitting about said collar; an abutment secured adjacent the end of the collar opposite the flange; a spring interposed between said abutment and disc-valve, urging the latter against the flange of the collar; said spring opposing flexing of said disc-valve; and a lighter spring urging the disc-valve upon the piston to close its passage.

EDWIN F. ROSSMAN.
FREDERICK D. FUNSTON.